US009428076B2

(12) United States Patent
Fleming et al.

(10) Patent No.: US 9,428,076 B2
(45) Date of Patent: *Aug. 30, 2016

(54) METHOD AND SYSTEM FOR MORE EFFICIENT OPERATION OF PLUG-IN ELECTRIC VEHICLES

(71) Applicant: Toyota Motor Engineering & Manufacturing North America, Inc., Erlanger, KY (US)

(72) Inventors: Matthew Eugene Fleming, Santa Ana, CA (US); Avernethy Francisco, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,370

(22) Filed: Oct. 6, 2014

(65) Prior Publication Data

US 2015/0025730 A1 Jan. 22, 2015

Related U.S. Application Data

(63) Continuation of application No. 12/699,790, filed on Feb. 3, 2010, now Pat. No. 8,855,840.

(51) Int. Cl.
| | |
|---|---|
| *B60L 11/18* | (2006.01) |
| *B60W 10/06* | (2006.01) |
| *B60W 10/08* | (2006.01) |
| *G06F 19/00* | (2011.01) |
| *B60W 10/26* | (2006.01) |
| *B60W 20/00* | (2016.01) |

(52) U.S. Cl.
CPC ........... *B60L 11/1862* (2013.01); *B60W 10/06* (2013.01); *B60W 10/08* (2013.01); *B60W 10/26* (2013.01); *B60W 20/13* (2016.01); *G06F 19/00* (2013.01); *B60W 20/00* (2013.01); *B60W 2510/244* (2013.01); *Y02T 10/6286* (2013.01); *Y02T 10/7005* (2013.01); *Y02T 10/7044* (2013.01)

(58) Field of Classification Search
CPC .... B60W 10/08; B60W 10/06; B60W 20/00; B60W 20/40; Y10S 903/93; B60L 11/1861; B60L 11/1862; B60L 11/1887
USPC ......................................................... 701/22
See application file for complete search history.

(56) References Cited

U.S. PATENT DOCUMENTS

| 7,671,567 B2 * | 3/2010 | Eberhard | ................ H02J 7/045 320/150 |
| 2011/0166732 A1 * | 7/2011 | Yu | ......................... B60W 10/26 701/22 |

* cited by examiner

*Primary Examiner* — Behrang Badii
*Assistant Examiner* — Daniel L Greene
(74) *Attorney, Agent, or Firm* — Snell & Wilmer LLP

(57) ABSTRACT

An automobile having an energy conversion unit, an energy storage unit, a user selection unit, a global positioning system, and a control unit. The automobile can operate in a default charging mode, which is either the charge depletion mode or the charge sustaining mode. Upon a user input, the energy conversation unit and/or the energy storage unit can operate in an extended charging mode or a forced charging mode. In the extended charging mode, the state of charge (SOC) is increased or decreased over a predetermined charging range. In the forced charging mode, the SOC is increased until a predetermined charge limit is reached. The automobile can also use global positioning system signals to operate in the charge depletion mode, the charge sustaining mode, the extended charging mode, and/or the forced charging mode.

33 Claims, 6 Drawing Sheets

METHOD AND SYSTEM FOR MORE EFFICIENT OPERATION OF PLUG-IN ELECTRIC VEHICLES

CROSS REFERENCE TO RELATED APPLICATIONS

This application is a continuation of U.S. application Ser. No. 12/699,790, entitled "Method and System for More Efficient Operation of Plug-In Electric Vehicles," filed on Feb. 3, 2010, now U.S. Pat. No. 8,855,840, the entire disclosure of which is hereby incorporated by reference herein.

BACKGROUND

1. Field

The present invention relates to a more efficient operation of plug-in electric vehicles.

2. Description of the Related Art

Conventional plug-in electric vehicles operate in a charge depletion mode until a minimum charge value has been reached and thereafter switches to a charge sustaining mode. However, such operations can be inefficient if the vehicle will travel a significant distance in charge sustaining mode. During such a trip, the state of charge ("SOC") of an energy storage unit will be depleted during situations where it would be more efficient to use the energy conversion unit utilizing stored fuel to propel the vehicle and/or increase the SOC; or during the charge sustaining mode where the SOC is being maintained at some minimal level even when it is more efficient to increase or decrease the SOC via the energy conversion unit utilizing stored fuel.

Furthermore, conventional plug-in electric vehicles which have been operating for some time will inevitably operate in the charge sustaining mode maintaining a minimal SOC in the energy storage unit. However, the conventional plug-in electric vehicle may desire to enter a city, which is concerned about emissions. The city may prohibit the plug-in electric vehicle from utilizing its engine to provide direct motive power, generating electrical power to operate the motor, and/or charging the energy storage unit at all. Thus, the plug-in electric vehicle must operate in the charge depletion mode. Since conventional plug-in electrical vehicles only maintain a minimal SOC in the energy storage unit while in the charge sustaining mode, the plug-in electric vehicles will not be able to travel very far before they needs to be plugged in to be charged. Alternatively, conventional plug-in electric vehicles must avoid the city altogether. Neither outcomes are particularly desirable for a user who drives a plug-in electric vehicle and wants to travel through the city.

Thus, there is a need for a more efficient operation of automobiles, such as plug-in electric vehicles.

SUMMARY

The present invention relates to a more efficient operation of automobiles, such as plug-in electric vehicles. In one embodiment, the present invention is an automobile, such as a plug-in electric vehicle, which includes an energy conversion unit, an energy storage unit, a user selection unit, a global positioning system, and a control unit. The automobile can operate in a default mode, which is either the charge depletion mode or the charge sustaining mode. However, upon a user input, the automobile such as the energy conversation unit and/or the energy storage unit can operate in an extended charging mode or a forced charging mode. In the extended charging mode, the SOC is increased or decreased over a predetermined charging range allowing for the SOC to be increased when it is efficient to do so and for the SOC to be decreased when it is efficient to do so. In the forced charging mode, the SOC is increased until a predetermined charge limit is reached. This allows the energy storage unit to have a large SOC which can be depleted if necessary to move the automobile.

Furthermore, the present invention can also use a global positioning system signal to operate in the charge depletion mode, the charge sustaining mode, the extended charging mode, and/or the forced charging mode. The global positioning system signal can allow the control unit to determine a distance from the automobile to a target location, driver behavior, traffic conditions, and/or road conditions, and depending on the location of the automobile and/or the distance to the target location, to operate the automobile in the charge depletion mode, the charge sustaining mode, the extended charging mode, and/or the forced charging mode. This allows the automobile to operate in the most desirable mode based on distance to the target location.

In one embodiment, the present invention is a method for operating an automobile including operating the automobile in a default charging mode, and operating the automobile in an extended charging mode.

In another embodiment, the present invention is a method for operating an automobile including operating the automobile in a charge depletion mode, the charge depletion mode substantially depleting an energy storage unit of the automobile, operating the automobile in a charge sustaining mode, the charge sustaining mode charging the energy storage unit in the automobile in a first predetermined charging range, and operating the automobile in a forced charging mode, the forced charging mode charging the energy storage unit of the automobile until the energy storage unit of the automobile has a substantially full charge, and thereafter maintaining the energy storage unit of the automobile at the substantially full charge.

In yet another embodiment, an automobile including an energy conversion unit, an energy storage unit connected to the energy conversion unit, the energy storage unit having a charge level, and supplying power to the energy conversion unit, or receiving power from the energy conversion unit, and a control unit electrically connected to the energy storage unit of the energy conversion unit, the control unit selecting the energy storage unit or the energy conversion unit to operate in a default charging mode, or an extended charging mode.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
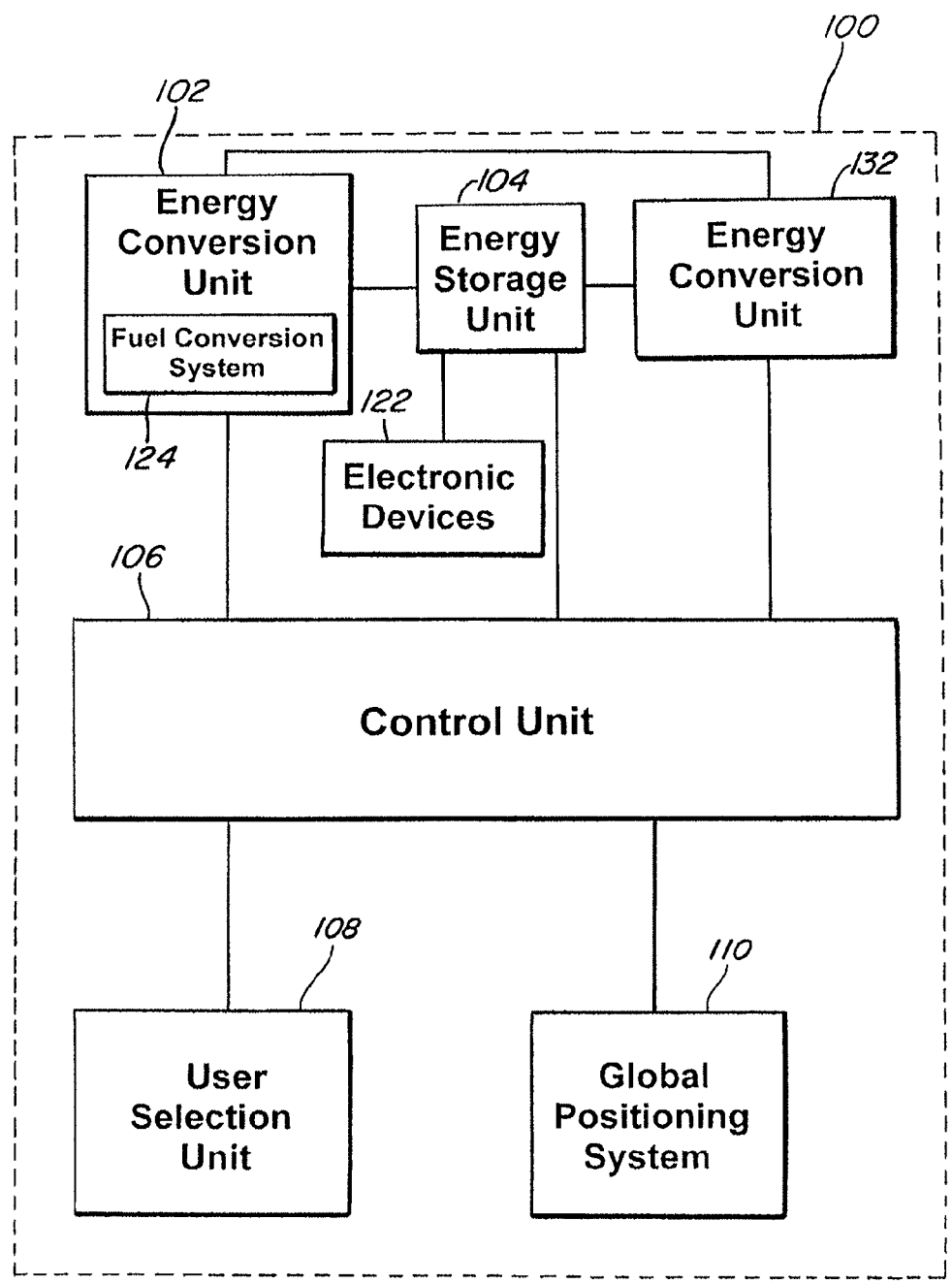
FIG. 1 is a block diagram of an automobile according to an embodiment of the present invention.

In one embodiment, the present invention includes an automobile 100 as shown in FIG. 1. The automobile 100 includes an energy conversion unit 102 (e.g., a first or main energy conversion unit), an energy conversion unit 132 (e.g., a second or auxiliary energy conversion unit), an energy storage unit 104, a control unit 106, a user selection unit 108, a global positioning system 110, and/or electronic devices 122. The automobile 100 can be, for example, a plug-in electric vehicle, a hybrid vehicle, a vehicle with a combustion engine, a hydrogen vehicle, a natural gas vehicle, and/or any other types of vehicles. The electronic devices 122 can be, for example, a radio, an air conditioning unit, headlights, lamps, sensors, power windows, or any other devices in the automobile 100 which requires or utilizes energy.

Figure 2:
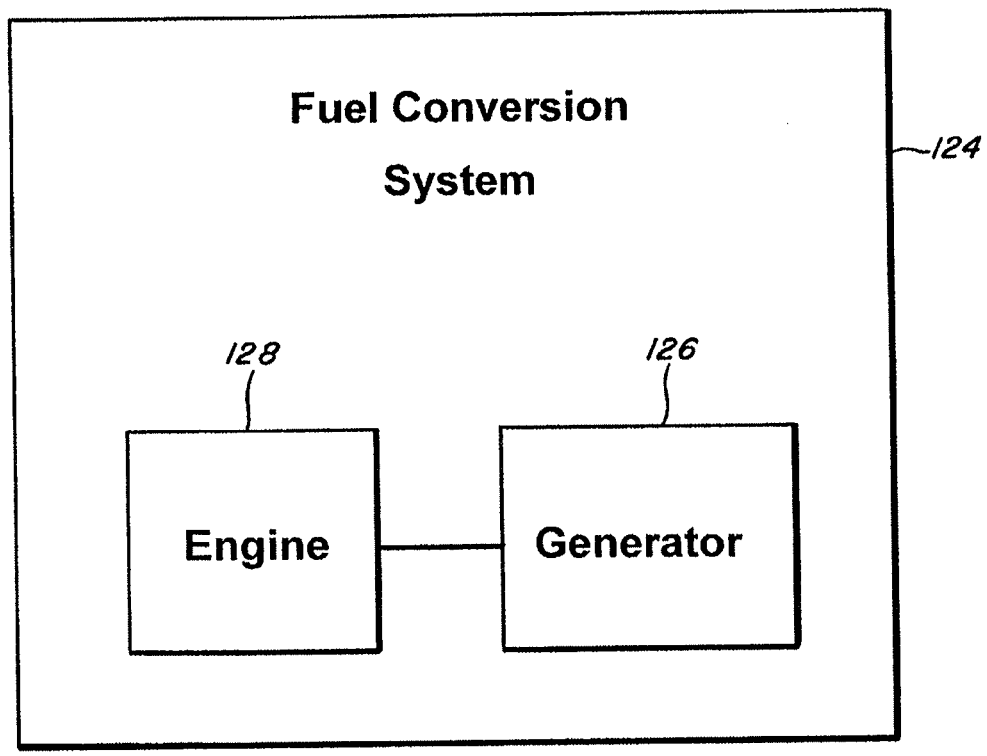
FIG. 2 is a block diagram of a fuel conversion system according to an embodiment of the present invention.

The energy conversion unit 102 can be connected to the control unit 106 and/or the energy storage unit 104. The energy conversion unit 102 can also be optionally connected to the energy conversion unit 132. The energy conversion unit 102 can include a fuel conversion system 124 allowing the energy conversion unit 102 to convert fuel to electrical energy. In one embodiment, as seen in FIG. 2, the fuel conversion system 124 can include an engine 128 connected to a generator 126. The operation of the engine 128 can generate motive force to move the automobile 100. However, the generator 126 can also generate energy from the operation of the engine 128, which can be transferred to the energy storage unit 104 and/or the energy conversion unit 132.

Figure 3:
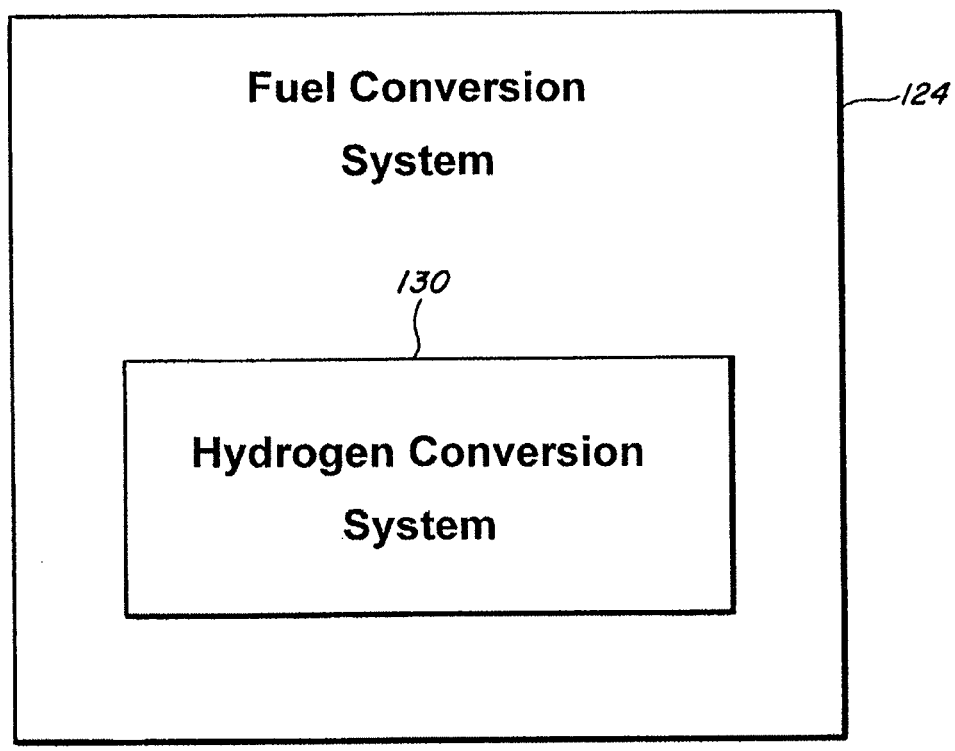
FIG. 3 is a block diagram of a fuel conversion system according to another embodiment of the present invention.

In another embodiment, as shown in FIG. 3, the fuel conversion system 124 includes a hydrogen conversion system 130. The hydrogen conversion system 130 can include, for example, hydrogen fuel cells which store and/or convert hydrogen fuel into energy. The energy can then be transferred to the energy storage unit 104. The hydrogen conversion system 130 may not provide motive force to move the automobile 100; however, the hydrogen conversion system 130 can provide energy which can be used by the energy conversion unit 132 to provide motive force to move the automobile 100. Furthermore, although examples of the fuel conversion system 124 are disclosed in FIG. 2 and FIG. 3, any other type of fuel conversion system may be used such that fuel may be converted into energy. In addition, although examples refer to the fuel conversion system 124 as disclosed in FIG. 2, any such examples may be applicable to the fuel conversion system 124 as disclosed in FIG. 3 or other types of fuel conversion systems, too.

The energy conversion unit 132 is connected to the energy storage unit 104 and/or the control unit 106. The energy conversion unit 132 is also optionally connected to the energy conversion unit 102. The energy conversion unit 132 can be, for example, a motor. The energy conversion unit 132 can use energy from the energy storage unit 104 and/or the energy conversion unit 102 to provide motive force to move the automobile 100. However, the energy conversion unit 132 can also capture energy from regenerative processes such as braking. Thus, the energy conversion unit 132 can transfer the captured energy to the energy storage unit 104 or use the captured energy stored in the energy storage unit 104 to move the automobile 100. The energy conversion unit 132 can also use energy from the energy conversion unit 102 to move the automobile 100.

The energy storage unit 104 is connected to the energy conversion unit 102, the energy conversion unit 132, the control unit 106, and/or the electronic devices 122. The energy storage unit 104 receives energy from the energy conversion unit 102 and/or the energy conversion unit 132 and stores the energy. The energy storage unit 104 can have, for example, a charge level, or state of charge ("SOC") corresponding to an amount of energy stored in the energy storage unit 104. The stored energy in the energy storage unit 104 can be used to power any electronic devices 122 within the automobile 100 and/or move the automobile 100. The energy storage unit 104 can be, for example, a battery, a mechanical energy storage device, and/or any other type of device which can store energy.

The energy conversion unit 102 and/or the energy storage unit 104 can operate in various modes such as a default mode, an extended charging mode, and/or a forced charging mode. The default mode can include, for example, a charge depletion mode and/or a charge sustaining mode. In the charge depletion mode, the energy conversion unit 102 does not provide energy to the energy storage unit 104 and the energy storage unit 104 is depleted. The energy storage unit 104 can be depleted, for example, by providing energy to the energy conversion unit 132, such as to move the automobile 100, and/or providing energy to the electronic devices 122 within the automobile 100. In one embodiment, the energy conversion unit 102 can be inoperative and the energy conversion unit 132 supplies the only motive force to move the automobile 100.

For example, regardless of whether it is more efficient or inefficient to do so, the energy storage unit 104 is depleted and the SOC is decreased. For example, the SOC of the energy unit 104 can be depleted, even when it may be more efficient to be operating the engine 128 and/or the generator 126 (FIG. 2) to move the automobile 100 and/or to generate energy which can be stored in the energy storage unit 104 for later use.

For example, it may take only 15 kW to move the automobile 100. In the charge depletion mode, the 15 kW is drawn from the energy storage unit 104 by the energy conversion unit 132 and used by the energy conversion unit 132 to move the automobile 100. The energy conversion unit 102 can be inoperative and therefore, the engine 128 and the generator 126 can be inoperative, too. Thus, no energy is generated by the operation of the engine 128 and the generator 126. However, in certain situations, instead of using the energy conversion unit 132, it may be more efficient to have the engine 128 and the generator 126 generate 21 kW, use 15 kW to move the automobiles 100, and store the remaining 6 kW in the energy storage unit 104.

Figure 4:
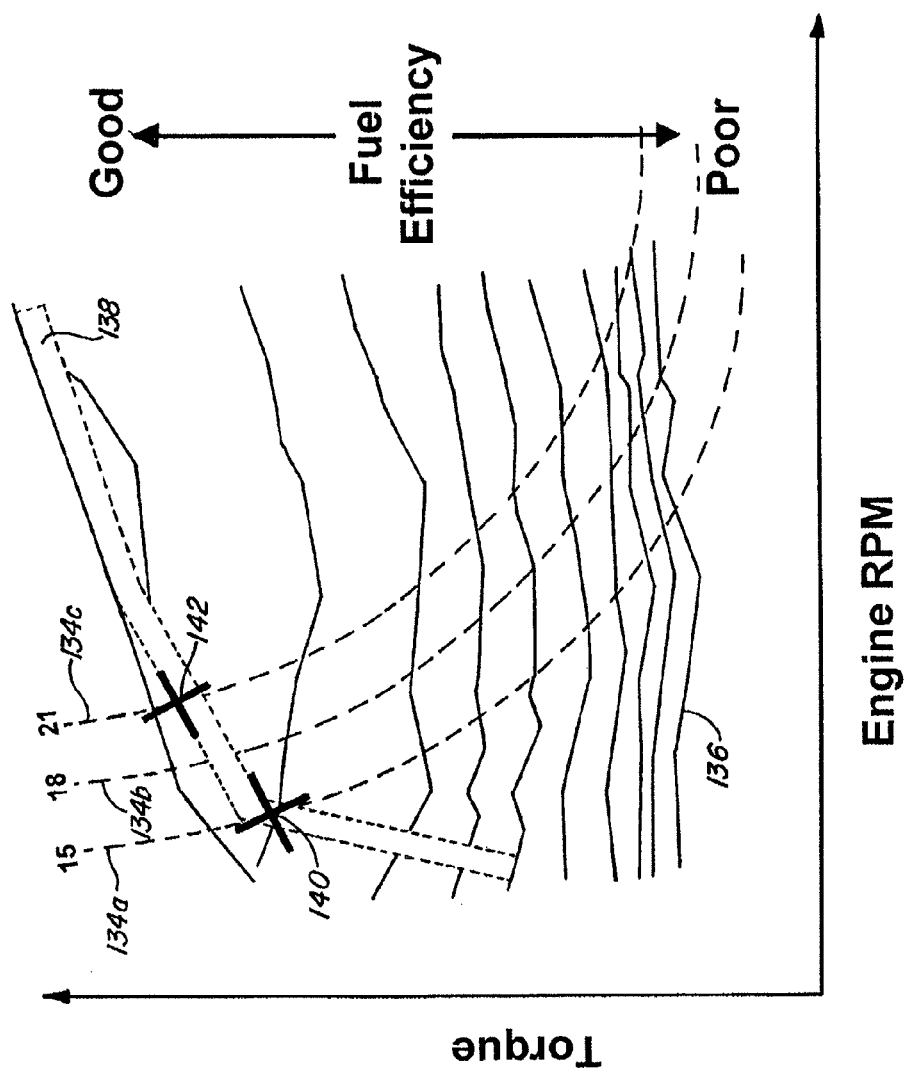
FIG. 4 is an operation graph of an engine and/or a generator according to an embodiment of the present invention.

This can be illustrated, for example, in FIG. 4. In FIG. 4, lines 134a, 134b, and 134c represent the lines of constant power for the engine 128 and the generator 126. The line 134a indicates the engine 128 operation which generates 15 kW of power, while the line 134b indicates the engine 128 operation which generates 18 kW of power, and the line 134c indicates the engine 128 operation which generates 21 kW of power. The lines 136 indicate a fuel efficiency of the engine 128 and/or the generator 126 on a per g/(kW-hr) basis. The area 138 indicates the actual operation of the engine 128 and the generator 126 in the automobile 100. As can be seen at the point 140, the engine 128 generates approximately 15 kW of power, while at the point 142, the engine 128 generates approximately 21 kW of power. However, on a per g/(kW-hr) basis, it is more efficient to generate 21 kW of power than it is to generate 15 kW of power.

During the charge sustaining mode, the energy conversion unit 102 and/or the energy storage unit 104 maintains the SOC at a relatively constant energy level with deviations to the constant energy level minimized, or with a minimal charging range. For example, regardless of whether the automobile 100 it is more efficient or inefficient to do so, the SOC of the energy storage unit 104 can vary in a first predetermined charging range. Thus, referring to FIG. 4, the engine 128 and the generator 126 may only operate at the point 140 to generate the 15 kW necessary to move the automobile 100 instead of at the point 142 to generate an additional 6 kW in addition to the 15 kW necessary to move the automobile 100. As can be seen, this can lead to a more inefficient operation of the automobile 100 since it may be more efficient to operate the automobile 100 at the point 142 instead of the point 140.

The first predetermined charging range can be, for example, a charging range of 10% SOC to 15% SOC. In one embodiment, the SOC can vary from a SOC level of 10% SOC to 20% SOC or a SOC level of 10% SOC to 25% SOC, which is a first predetermined charging range of 10% SOC (20% SOC–10% SOC) to 15% SOC (25% SOC–10% SOC). Thus, the energy conversion unit 102 can supply power to the energy storage unit 104 to maintain the SOC within the first predetermined charging range.

In the extended charging mode, the conversion unit 102 and/or the energy storage unit 104, opportunistically charges the energy storage unit 104 within a second predetermined charging range, which is an extended charging range. The conversion unit 132 can opportunistically charge and/or deplete the energy storage unit 104 within the second predetermined charging range. In one embodiment, the second predetermined charging range can be, for example, 60% SOC to 80% SOC. The second predetermined charging range can be any charging range greater than the first predetermined charging range.

For example, the SOC of the energy storage unit can have a varying SOC level of 20% SOC to 80% SOC, and/or 10% SOC to 90% SOC, which is the second predetermined charging range of 60% SOC (80% SOC–20% SOC) to 80% SOC (90% SOC–10% SOC). This allows the energy conversion unit 102 and/or the energy storage unit 104 to operate efficiently since the energy storage unit 104 can be charged to increase the SOC when it is efficient to do so and be depleted to decrease the SOC level when it is efficient to do so. Referring back to FIG. 4, the engine 128 and/or the generator 126 can operate at the point 142 when it is more efficient to do so, operate at the point 140 when it is more efficient to do so, or not at all with, for example, the engine 128 off.

For example, in certain situations it may be more efficient for the engine 128 and/or the generator 126 to operate at the point 142 without the use of the energy conversion unit 132 to move the automobile 100. In other situations, it may be more efficient to operate the engine 128 and the generator 126 at the point 140 with the use of the energy conversion unit 132 to move the automobile 100. In the extended charging mode, the energy conversion unit 102 including the engine 128 and/or the generator 126 can dynamically operate at different levels in the region 138 to ensure a more efficient overall operation of the automobile 100.

In the forced charging mode, the conversion unit 102 charges the energy storage unit 104 to actively increase the SOC level until a predetermined charge limit, and thereafter maintains the SOC level of the energy storage unit 104 at substantially the predetermined charge limit. The predetermined charge limit can be, for example 80% SOC. However, the predetermined charge limit can be any percentage of SOC. In one embodiment, the predetermined charge limit is less than 100% SOC, to allow for natural recharging situations, such as during regenerative braking. In another embodiment, the SOC level of the energy storage unit 104 may be increased even when it may be inefficient to do so for the overall operation of the automobile 100. For example, referring back to FIG. 4, the engine 128 and/or the generator 126 may operate at the point 142 instead of the point 140 in order to charge the energy storage unit 104 even when it may be more efficient to operate the engine 128 and the generator 126 at the point 140 or be inactive and utilize the energy conversion unit 132. This may be beneficial, for example, when the user wishes to have a higher SOC level in the energy storage unit 104.

The user selection unit 108 is connected to the control unit 106. The user selection unit 108 can receive user input regarding operational preferences of the automobile 100 and provide the user input to the control unit 106. The user selection unit 108 can be, for example, buttons, a keyboard, voice capture and translation devices, image capturing and translation devices, video capturing and translation devices, joysticks, or any other type of devices capable of capturing user preferences. The user selection unit 108, for example, can receive user input indicating which mode the user wishes to operate the automobile 100. For example, the user selection unit 108 can receive user input indicating that the user wishes to operate the automobile 100 in either the default mode, the extended charging mode, and/or the forced charging mode.

The global positioning system 110 is connected to the control unit 106. The global positioning system 110 can receive global positioning system signals. The global positioning system 110 can use the global positioning system signals to determine a location of the automobile 100 and provide positioning data to the control unit 106. The positioning data can indicate, for example, a location of a target location, a location of the automobile, and/or a distance between the target location and the automobile.

Furthermore, the global positioning system 110 can also provide characteristic information of the target location and/or the location of the automobile to the control unit 106. For example, the characteristic information can include any operational requirements of the target location and/or the location of the automobile. The target location can require, for example, that the automobile 100 operate in certain modes in order to preserve and/or improve air quality. In addition, the characteristic information could include, for example, a lack of charging stations in the target location.

Furthermore, the positioning data and the characteristic information can be used by the control unit 106 to determine the operation mode for the energy conversion unit 102 and/or the energy storage unit 104. For example, the control unit 106 can use the positioning data and/or the characteristic information to determine whether the energy conversion unit 102 and/or the energy storage unit 104 should be operating in the default mode, the extended charging mode, or the forced charging mode.

The control unit 106 is connected to the energy conversion unit 102, the energy conversion unit 132, the energy storage unit 104, the user selection unit 108, and/or the global positioning system 110. The control unit 106 can include, for example, one or more processors located in a single location or multiple locations. The one or more processors can communicate with each other and cooperate to function as the control unit 106. The control unit 106 can determine the charging mode of the energy conversion unit 102 and/or the energy storage unit 104 and switch charging modes of the energy conversion unit 102 and/or the energy storage unit 104 when appropriate. For example, when the automobile is first started, the control unit 106 could indicate to the energy conversion unit 102 and/or the energy storage unit 104 that it should operate in the default mode.

However, upon user input signifying a desire to operate in an extended charging mode, or a forced charging mode, the control unit 106 can indicate to the energy conversion unit 102 and/or the energy storage unit 104 that it should operate in the extended charging mode, or the forced charging mode. Likewise, upon user input signifying a desire to change modes based upon positioning data, the control unit 106 can indicate to the energy conversion unit 102 and/or the energy storage unit 104 to operate in the default mode, the extended charging mode, or the forced charging mode based upon the positioning data.

Figure 5:
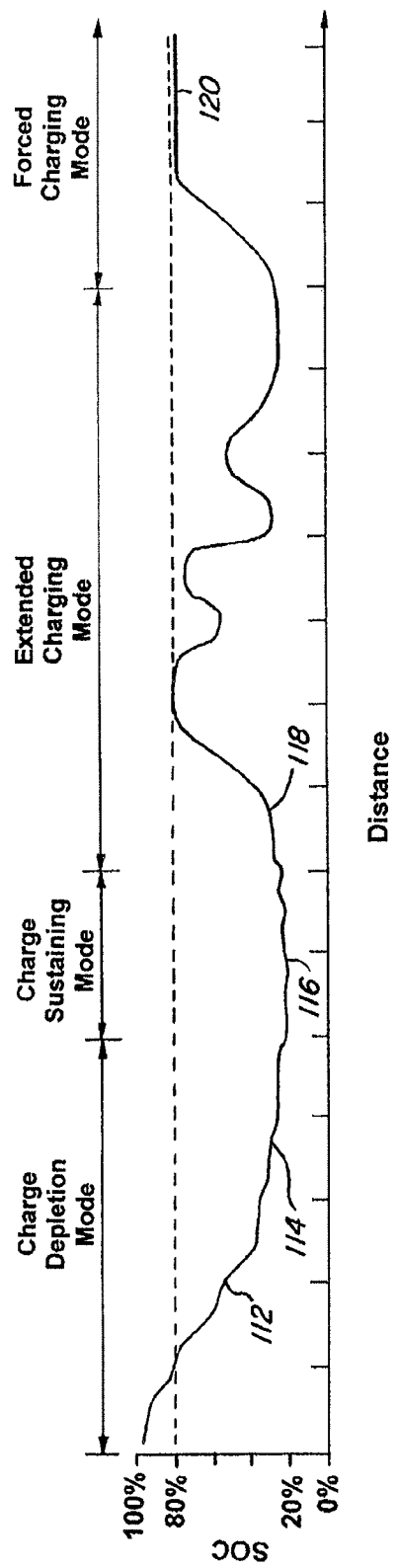
FIG. 5 is a graph of strength of charge over distance for various modes of operation for an automobile according to an embodiment of the present invention.

The SOC level of the energy storage unit 104 when the energy storage unit 104 and/or the energy conversion unit 102 are operating under different modes can be seen in FIG. 5. As seen in FIG. 5, the line 112 represents the SOC of the energy storage unit 104. When the automobile is first started, the energy conversion unit 102 and/or the energy storage unit 104 are operating under the default mode and thus the automobile operates in the charge depletion mode, and then the charge sustaining mode.

Therefore, the control unit 106 instructs the energy storage unit 104 and/or the energy conversion unit 102 to operate in the charge depletion mode as seen in portion 114 of the line 112 when the automobile first starts, until the SOC of the energy storage unit 104 reaches a predetermined minimum charge threshold. In FIG. 5, the predetermined minimum charge threshold is, for example, a SOC level of 20% SOC, but can be any percentage which is sufficient to safely run the automobile.

Once the predetermined minimum charge threshold is reached, the control unit 106 instructs the energy conversion unit 102 and/or the energy storage unit 102 to operate in the charge sustaining mode as seen in the portion 116 of the line 112. As can be seen, in the charge sustaining mode, the SOC level of the energy storage unit 104 is maintained at a relatively constant level at approximately 20% SOC within a first predetermined charging range. The first predetermined charging range can be, for example 10% SOC to 15% SOC.

The control unit 106 can also receive user input signifying a desire to change modes to an extended charging mode, or a desire to change modes based upon positioning data. Thus, when the positioning data indicates that the mode should be the extended charging mode or the user input indicates that the mode should be the extended charging mode, the control unit 106 can instruct the energy storage unit 104 and/or the energy conversion unit 102 to operate at the extended charging mode as seen in the portion 118 of the line 112.

During the extended charging mode, the SOC of the energy storage unit 104 is increased or decreased based upon the conditions of the automobile. For example, the SOC of the energy storage unit 104 is increased when it is efficient to do so and the SOC of the energy storage unit 104 is decreased when it is efficient to do so. This allows the SOC to vary so that the energy conversion unit 102 and/or the energy storage unit 104 can operate more efficiently. Thus, the automobile 100 can operate more efficiently and improve, for example, a trip efficiency.

As seen in FIG. 5, the extended charging mode can vary the SOC in the second predetermined charging range, from SOC levels of 20% SOC to 80% SOC. Thus, in FIG. 5, the second predetermined charging range is between SOC levels 20% SOC to 80% SOC, or a second predetermined charging range of 60% SOC. Although the second predetermined charging range is 60% SOC in FIG. 5, the second predetermined charging range can be any number greater than the first predetermined charging range such that the energy conversion unit 102 and/or the energy storage unit 104 can operate more efficiently. The variation in the SOC during the extended charging mode allows the SOC of the energy storage unit 104 to be increased or decreased based on efficiency as opposed to being forced to increase when it is inefficient to do so, or being forced to decrease when it is inefficient to do so. Thus, the SOC during the extended charging mode can be increased or decreased based on an efficiency of the automobile 100, such as a trip efficiency of the automobile 100.

The control unit 106 can also receive user input signifying a desire to change modes to a forced charging mode, or a desire to change modes based upon positioning data and/or the characteristic information. Thus, when the positioning data and/or the characteristic information indicates that the mode should be the forced charging mode or the user input indicates that the mode should be the forced charging mode, the control unit 106 can instruct the energy storage unit 104 and/or the energy conversion unit 102 to operate at the forced charging mode as seen in the portion 120 of the line 112.

During the forced charging mode, the SOC of the energy storage unit 104 is increased until it reaches the predetermined charge limit, which is 80% SOC in FIG. 5. This allows the user to have a substantially larger reserve of charge in the energy storage unit 104. This can be beneficial, for example, if the user is a predetermined distance from an area where the user must be in charge depletion mode and the user needs to expend the SOC in the energy storage unit 104 to only move the automobile 100 using the energy conversion unit 132 instead of the energy conversion unit 102. For example, a city may be particularly concerned about emissions and may require that all vehicles passing through the city operate in the charge depletion mode and turn off the engine 128 and/or the generator 126 in the energy conversion unit 102. This can also be beneficial if there will be no charging stations in the target location.

Figure 6:
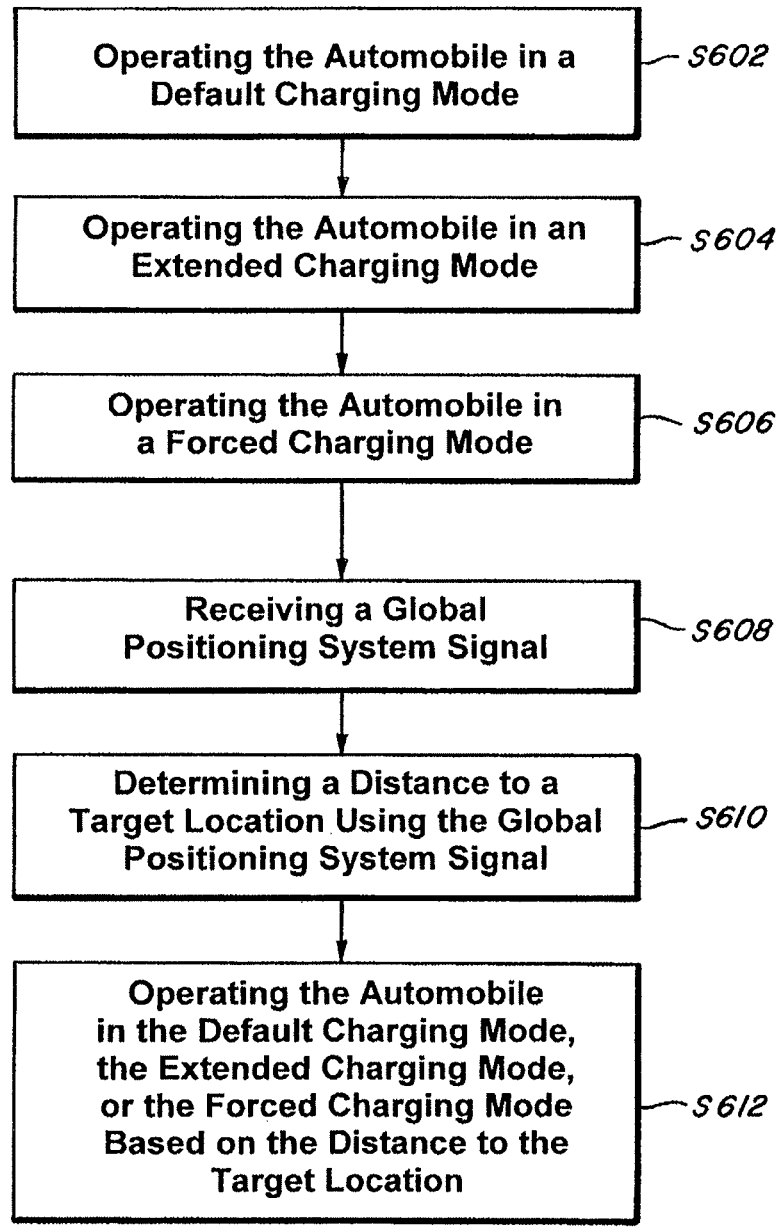
FIG. 6 is a process according to an embodiment of the present invention.

In one embodiment, the present invention is a process according to FIG. 6. In Step S602, the automobile is operated in a default charging mode. For example, the energy storage unit 104 and/or the energy conversion unit 102 can operate in the default charging mode, such as the charge depletion mode, and/or the charge sustaining mode. In Step S604, the automobile is operated in an extended charging mode. For example, the energy storage unit 104 and/or the energy conversion unit 102 can operate in the extended charging mode. In Step S606, the automobile is operated in the forced charging mode. For example, the energy storage unit 104 and/or the energy conversion unit 102 can operate in the forced charging mode.

In Step S608, a global positioning system signal is received. For example, the control unit 106 can receive a GPS signal from the GPS 110. In Step S610, a distance to a target location can be determined using the global positioning system signal. For example, the control unit 106 can determine a distance to a target location, such as a desired city, using the GPS signal to determine positioning data. In Step S612, the automobile is operated in the default charging mode, the extended charging mode, or the forced charging mode based on the distance to the target location. For example, depending on how close the automobile is to the target location, the control unit 106 can operate the automobile 100 in the default charging mode, the extended charging mode, or the forced charging mode.

Thus, the automobile 100 could be operating in the default charging mode or the extended charging mode, but when the distance to the target location is less than a predetermined distance, the automobile 100 could switch to the forced charging mode. The control unit 106 could also operate the automobile 100 in the default charging mode, the extended charging mode, or the forced charging mode depending on the characteristic information of the target location. This can be beneficial, if the target location is a location which restricts operation of the engine 128 and/or the generator 126 in the energy conversion unit 102, and requires, for example, the automobile 100 to operate at the charge depletion mode.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for operating an automobile having an energy storage unit with a state of charge and an energy conversion unit for powering the automobile, the method comprising:
   configuring the automobile to operate in a charge depletion mode that decreases the state of charge of the energy storage unit due to energy being provided by the energy storage unit to power the automobile;
   configuring the automobile to operate in a charge sustaining mode that maintains the state of charge of the energy storage unit within a first charging range by powering the automobile using energy from the energy conversion unit; and
   configuring the automobile to operate in an extended charging mode that asynchronously increases the state of charge of the energy storage unit using energy from the energy conversion unit to charge the energy storage unit and decreases the state of charge of the energy storage unit to power the automobile to maintain the state of charge of the energy storage unit within a second charging range that is greater than the first charging range.

2. The method of claim 1, further comprising configuring the automobile to operate in the extended charging mode when a user selects the extended charging mode.

3. The method of claim 1, further comprising:
   determining or receiving positioning data related to at least one of a location of the automobile, a location of a destination or a distance between the automobile and the destination; and
   configuring the automobile to operate in the charge depletion mode, the charge sustaining mode or the extended charging mode based on at least the positioning data.

4. The method of claim 1, wherein
   the first charging range is between a first state of charge limit value and a second state of charge limit value,
   the second charging range is between a third state of charge limit value and a fourth state of charge limit value, and
   the fourth state of charge limit value is greater than the second state of charge limit value.

5. The method of claim 1, wherein
   the first charging range is between a first state of charge limit value and a second state of charge limit value, the second charging range is between a third state of charge limit value and a fourth state of charge limit value, and the third state of charge limit value is greater than or equal to the first state of charge limit value and less than or equal to the second state of charge limit value.

6. The method of claim 1, wherein configuring the extended charging mode to asynchronously increase and decrease the state of charge of the energy storage unit within the second charging range is based on at least one of a condition of the automobile or a preference of a user of the automobile.

7. The method of claim 6, further comprising:
receiving, using a user selection unit of the automobile, a user input; and
determining the preference of the user of the automobile based on at least the user input.

8. The method of claim 6, wherein the condition of the automobile includes fuel efficiency of an operation of the energy conversion unit or the automobile.

9. The method of claim 1, further comprising configuring the automobile to operate in a forced charging mode that automatically increases the state of charge of the energy storage unit until the state of charge of the energy storage unit reaches a forced charging threshold, and thereafter maintains the state of charge of the energy storage unit at or within a proximity of the forced charging threshold.

10. The method of claim 9, further comprising configuring the automobile to operate in the forced charging mode when a user of the automobile selects the forced charging mode.

11. The method of claim 9, further comprising:
determining or receiving positioning data related to at least one of a location of the automobile, a location of a destination or a distance between the automobile and the destination; and
configuring the automobile to operate in the charge depletion mode, the charge sustaining mode, the extended charging mode or the forced charging mode based on at least the positioning data.

12. The method of claim 1, wherein the first charging range is between a first state of charge limit value and a second state of charge limit value, and a difference between the second state of charge limit value and the first state of charge limit value is less than or equal to 15% of a full state of charge value of the energy storage unit.

13. The method of claim 12, wherein the second charging range is between a third state of charge limit value and a fourth state of charge limit value, and a difference between the fourth state of charge limit value and the third state of charge limit value is less than or equal to 80% of the full state of charge value of the energy storage unit.

14. A method for operating an automobile, comprising:
providing an energy storage unit with a state of charge;
providing an energy conversion unit having an engine for at least one of powering a movement of the automobile, storing energy in the energy storage unit, or powering an electronic device of the automobile; and
configuring the automobile to operate in an extended charging mode that asynchronously increases and decreases the state of charge of the energy storage unit to maintain the state of charge of the energy storage unit within a charging range that is between a first state of charge limit value and a second state of charge limit value.

15. The method of claim 14, wherein the first state of charge limit value is 20% of a full state of charge value of the energy storage unit, and the second state of charge limit value is 80% of the full state of charge value of the energy storage unit.

16. The method of claim 14, further comprising:
determining or receiving positioning data related to at least one of a location of the automobile, a location of a target location, or a distance between the automobile and the target location; and
setting, using the control unit, a current charging mode to the extended charging mode based on at least one of the positioning data or a current state of charge of the energy storage unit.

17. The method of claim 14, further comprising:
configuring the automobile to operate in a default charging mode which includes:
a charge depletion mode that decreases the state of charge of the energy storage unit, and
a charge sustaining mode that maintains the state of charge of the energy storage unit within a first charging range.

18. The method of claim 14, further comprising configuring the automobile to operate in a forced charging mode that automatically increases the state of charge of the energy storage unit until the state of charge of the automobile reaches a forced charging threshold, and thereafter maintains the energy storage unit at or within a proximity of the forced charging threshold.

19. The method of claim 14, further comprising configuring the automobile to operate in the extended charging mode to asynchronously increase and decrease the state of charge of the energy storage unit based on at least one of a condition of the automobile or a preference of a user of the automobile.

20. The method of claim 19, further comprising:
receiving, using a user selection unit of the automobile, a user input; and
determining the preference of the user of the automobile based on at least the user input.

21. The method of claim 19, wherein the condition of the automobile includes energy efficiency of an operation of the energy conversion unit or the automobile.

22. The method of claim 19, further comprising:
determining or receiving positioning data related to at least one of a location of the automobile, a location of a target location or a distance between the automobile and the target location,
wherein configuring the automobile to operate in the extended charging to asynchronously increase and decrease the state of charge of the energy storage unit is based on at least one of the condition of the automobile, the preference of the user of the automobile or the positioning data.

23. The method of claim 22, further comprising:
determining, using the control unit, a current trip of the automobile to the target location based on the positioning data,
wherein the condition of the automobile includes fuel efficiency of an operation of the automobile during the current trip.

24. A method for operating an automobile having an energy conversion unit for powering the automobile, an energy storage unit with a state of charge, and a control unit connected to the energy conversion unit, the method comprising:
configuring the automobile to operate in a charge depletion mode that decreases the state of charge of the energy storage unit due to energy being provided by the energy storage unit to power the automobile;

configuring the automobile to operate in a charge sustaining mode that maintains the state of charge of the energy storage unit within a first charging range by powering the automobile using energy from the energy conversion unit;

configuring the automobile to operate in an extended charging mode that asynchronously increases the state of charge of the energy storage unit using energy from the energy conversion unit to charge the energy storage unit and decreases the state of charge of the energy storage unit to power the automobile to maintain the state of charge of the energy storage unit within a second charging range which is greater than the first charging range; and configuring the automobile to operate in a forced charging mode that automatically increases the state of charge of the energy storage unit until the state of charge of the energy storage unit reaches a forced charging threshold, and thereafter maintains the energy storage unit at or within a proximity of the forced charging threshold.

25. The method of claim 24, further comprising:
receiving, using a user selection unit of the automobile, a user input; and
configuring the control unit to switch a current charging mode of the automobile from the charge sustaining mode to the forced charging mode based on at least the user input.

26. The method of claim 24, further comprising:
receiving, using a user selection unit of the automobile, a user input; and
configuring the control unit to switch a current charging mode of the automobile from the forced charging mode to the charge depletion mode based on at least the user input.

27. The method of claim 24, further comprising configuring the control unit to automatically switch a current charging mode of the automobile from the forced charging mode to the charge depletion mode.

28. The method of claim 24, further comprising configuring the control unit to automatically switch a current charging mode of the automobile from the charge depletion mode to the forced charging mode.

29. The method of claim 24, wherein the forced charging threshold is a full state of charge value of the energy storage unit.

30. The method of claim 24, further comprising:
configuring a motor of the automobile to power a movement of the automobile using energy from the energy storage unit; and configuring the charge depletion mode to propel the movement of the automobile using the motor and energy from the energy storage unit.

31. An automobile comprising:
an energy storage unit for storing electrical energy and having a state of charge;
a first energy conversion unit including an engine for powering a movement of the automobile or providing energy to the energy storage unit;
a second energy conversion unit including a motor for moving the automobile using the electrical energy stored in the energy storage unit; and
a control unit connected to the first energy conversion unit and the second energy conversion unit, the control unit configured to:
operate the automobile in a charge depletion mode that decreases the state of charge of the energy storage unit due to energy being provided by the energy storage unit to power the automobile,
operate the automobile in a charge sustaining mode that maintains the state of charge of the energy storage unit within a first charging range by powering the automobile using energy from the energy conversion unit,
operate the automobile in an extended charging mode that asynchronously increases the state of charge of the energy storage unit and decreases the state of charge of the energy storage unit to maintain the state of charge of the energy storage unit within a second charging range which is greater than the first charging range, and
switch a current charging mode from the charge depletion mode to the charge sustaining mode when the state of charge of the energy storage unit reaches a first state of charge threshold.

32. The automobile of claim 31, wherein the control unit is configured to:
determine or receive positioning data related to at least one of a location of the automobile, a location of a target location, or a distance between the automobile and the target location, and
set a current charging mode to the charge depletion mode or the charge sustaining mode based on the positioning data.

33. The automobile of claim 31, wherein the control unit is configured to operate the automobile in a forced charging mode that increases the state of charge of the energy storage unit until the state of charge of the automobile reaches a forced charging threshold, and thereafter maintains the energy storage unit at the forced charging threshold.

* * * * *